M. NOWAK.
Velocipedes.
No. 152,160. Patented June 16, 1874.
Fig: 1.
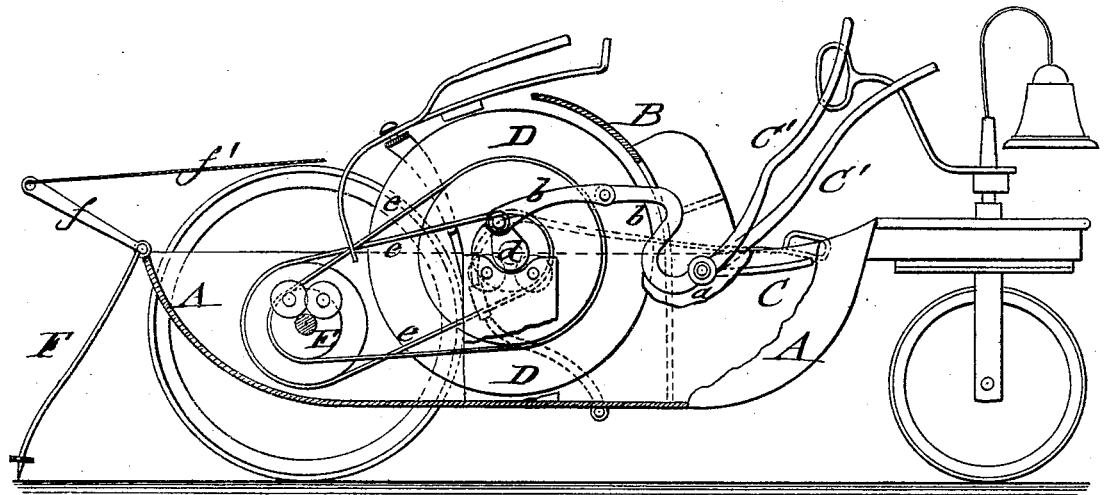
Fig: 2.
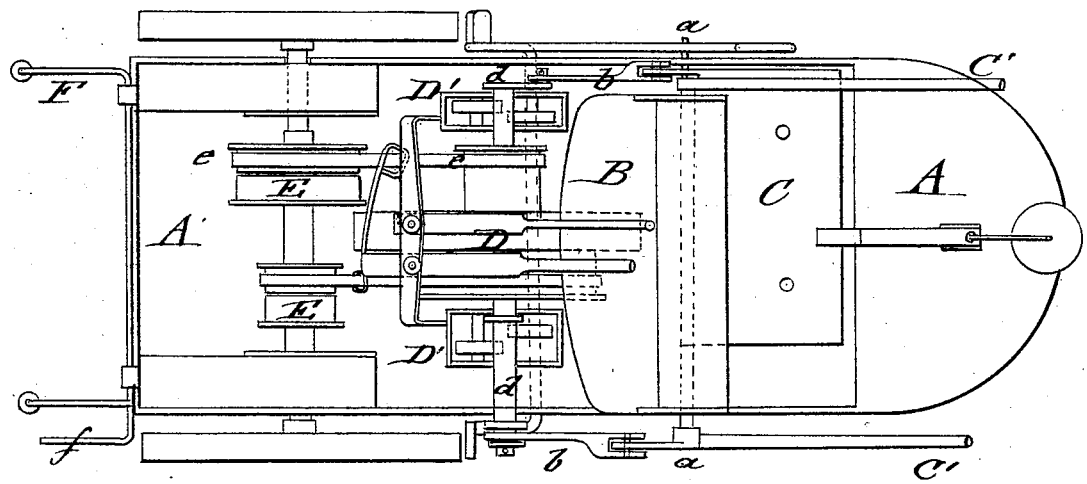
WITNESSES:
Chas. Nida
P. Sedgwick
INVENTOR:
M. Nowak
BY
ATTORNEYS.

UNITED STATES PATENT OFFICE.

MORIZ NOWAK, OF JEFFERSONVILLE, NEW YORK.

IMPROVEMENT IN VELOCIPEDES.

Specification forming part of Letters Patent No. 152,160, dated June 16, 1874; application filed April 4, 1874.

*To all whom it may concern:*

Be it known that I, MORIZ NOWAK, of Jeffersonville, in the county of Sullivan and State of New York, have invented a new and Improved Velocipede, of which the following is a specification:

In the accompanying drawing, Figure 1 represents a sectional side elevation of my improved velocipede, and Fig. 2 a top view of the same.

Similar letters of reference indicate corresponding parts.

My invention relates to improvements in velocipedes or vehicles which are propelled by the action of the occupants; and it consists of a carriage body or frame placed on wheels, and driven by means of a pivoted foot board or treadle, which communicates motion by a fly-wheel, belts, and pulleys to the hind axle, while the front wheels serve for steering the vehicle. Suitable devices for retarding and arresting the motion of the vehicle are applied in connection with the same.

In the drawings, A represents the carriage-shaped body or frame of the velocipede, which is supported on larger hind or driving wheels, and one or two smaller front or steering wheels. A seat, B, is firmly attached to the body A, and a foot board or treadle, C, pivoted to shaft *a* of body A. One or two hand-levers, C', are also attached to shaft *a*, for producing the starting of the treadle C. Treadle-shaft *a* connects, by pivoted lever and crank-rods *b*, with the crank-shaft *d* of a fly-wheel, D, which turns in suitable anti-frictional bearings D' of the body of the vehicle back of seat B. Fly-wheel D is made of any approved construction, with sufficient momentum for producing a steady continuous rotary motion. It connects, by means of one or more belts, *e*, with one or more fast and loose pulleys, E, of the axle of the hind wheels, the pulleys being made of unequal size, to produce a greater or lesser speed of the velocipede. Suitable gear for transferring the belts from one pulley to the other, as well as brakes for the fly-wheel and the hind wheels, may be used.

After the vehicle or velocipede is started by the hand-lever, the action of the feet on the treadle will keep the same in motion, it being steered in the direction required by string or lever connection with the front wheels.

One or more pointed rods, F, are pivoted to the rear part of frame A, and connected by a lever-arm, *f*, and string *f'* to the seat, for the purpose of being lowered or raised, as required, for stopping or moving the vehicle. The brace-rods are of great advantage for ascending hills, as the vehicle may be retained in position for taking rest.

Having thus described my invention, I claim as new and desire to secure by Letters Patent—

The vehicle constructed of body A, with seat B, and pivoted treadle C, connected to fly-wheel D and pulleys E of the axle of the driving-wheels, all combined for propulsion substantially as and for the purpose set forth.

M. NOWAK.

Witnesses:
A. S. MACDONALD,
SIDNEY TUTTLE.